US008161719B2

(12) United States Patent
Barnett et al.

(10) Patent No.: US 8,161,719 B2
(45) Date of Patent: *Apr. 24, 2012

(54) ROTARY DISK CROP HARVESTING HEADER WITH AN AUGER AND IMPELLERS FOR CONVERGING THE CROP

(75) Inventors: Neil Gordon Barnett, Winnipeg (CA); Geoffrey U. Snider, Winnipeg (CA)

(73) Assignee: MacDon Industries Ltd., Winnipeg, Manitoba (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,081

(22) Filed: Jul. 26, 2011

(65) Prior Publication Data

US 2011/0277437 A1 Nov. 17, 2011

Related U.S. Application Data

(62) Division of application No. 12/817,273, filed on Jun. 17, 2010, now Pat. No. 8,015,784.

(60) Provisional application No. 61/223,967, filed on Jul. 8, 2009.

(51) Int. Cl.
*A01D 43/02* (2006.01)

(52) U.S. Cl. .......................................... 56/157; 56/17.3

(58) Field of Classification Search ................... 56/17.3, 56/157, 14.5, 192, 6, 7
See application file for complete search history.

(56) References Cited

U.S. PATENT DOCUMENTS

| 2,312,785 A | 3/1943 | Welty |
| 2,906,077 A | 9/1959 | Hale |
| 3,014,324 A | 12/1961 | McCarty |
| 3,412,535 A * | 11/1968 | Drummond ................... 56/14.4 |
| 3,509,699 A | 5/1970 | Calder |
| 4,185,445 A * | 1/1980 | van der Lely ....................... 56/6 |
| 4,244,163 A | 1/1981 | Gantzer |
| 4,330,982 A | 5/1982 | Vissers |

(Continued)

FOREIGN PATENT DOCUMENTS

CA 2166671 4/1997

(Continued)

OTHER PUBLICATIONS

Brochure by AGCO Jul. 15, 2008 for the 9190 and 9192 Rotary Disk Headers, p. 6.

*Primary Examiner* — Arpad Fabian-Kovacs
(74) *Attorney, Agent, or Firm* — Adrian D. Battison; Ade & Company Inc.

(57) ABSTRACT

A crop header has generally horizontal flail disks mounted for driven rotation about generally upright axes. A pair of conditioner rolls is mounted in a discharge opening. A crop converging system includes two over-shot auger elements defined by a common auger shaft with an auger flight carried thereon arranged generally longitudinal of the cutter bar so as to carry the cut crop longitudinally of the cutter bar to the entrance opening. Each auger element is arranged with a forwardmost tangent to the auger flight located behind the axes of the rotary disks and with an outer end thereof spaced outwardly of the respective end of the entrance mouth. The common auger shaft is driven by a common rotary drive with the bottom roll of the conditioner rolls. The augers terminate inwardly of the outer end of the cutter bar to locate the drive inboard of the end plates.

19 Claims, 10 Drawing Sheets

U.S. PATENT DOCUMENTS

| | | | |
|---|---|---|---|
| 4,637,201 A | 1/1987 | Pruitt et al. | |
| 4,739,609 A | 4/1988 | Meier | |
| 4,809,488 A | 3/1989 | Neuerberg | |
| 5,272,859 A | 12/1993 | Pruitt | |
| 5,327,709 A | 7/1994 | Webb | |
| 5,345,752 A * | 9/1994 | Pruitt et al. | 56/6 |
| 5,433,064 A | 7/1995 | Schmitt | |
| 5,463,852 A | 11/1995 | O'Halloran | |
| 5,768,865 A | 6/1998 | Rosenbalm | |
| 5,852,921 A | 12/1998 | Neuerberg | |
| 6,047,532 A | 4/2000 | O'Halloran | |
| 6,058,688 A * | 5/2000 | Krambeck et al. | 56/14.5 |
| 6,158,201 A | 12/2000 | Pruitt | |
| 6,564,535 B1 * | 5/2003 | Nafziger et al. | 56/14.5 |
| 6,581,362 B2 | 6/2003 | Rosenbalm | |
| 6,718,743 B2 | 4/2004 | Rosenbalm | |
| 7,165,381 B2 | 1/2007 | Rosenbalm | |
| 7,340,876 B1 | 3/2008 | Barnett | |
| 7,356,982 B2 | 4/2008 | Barnett | |
| 7,454,888 B2 | 11/2008 | Barnett | |
| 7,621,113 B2 | 11/2009 | Blakeslee et al. | |
| 7,644,566 B2 | 1/2010 | Diederich et al. | |
| 7,661,253 B2 | 2/2010 | Pruitt et al. | |
| 7,726,108 B1 | 6/2010 | Pruitt | |
| 2005/0126142 A1 * | 6/2005 | Rosenbalm et al. | 56/6 |
| 2008/0016837 A1 | 1/2008 | Rosenbalm | |
| 2008/0066439 A1 | 3/2008 | Barnett | |
| 2008/0066440 A1 | 3/2008 | Barnett | |
| 2008/0256920 A1 | 10/2008 | Yanke | |
| 2009/0071116 A1 | 3/2009 | Barnett | |
| 2009/0250317 A1 | 10/2009 | Blakeslee et al. | |
| 2010/0269475 A1 | 10/2010 | Barnett et al. | |

FOREIGN PATENT DOCUMENTS

| | | |
|---|---|---|
| CA | 2559217 | 9/2006 |
| CA | 2639032 | 7/2008 |
| CA | 2559353 | 1/2009 |
| CA | 2578907 | 4/2010 |
| DE | 32 24 170 | 12/1983 |
| DE | 35 01 133 | 7/1986 |
| EP | 0 116 661 | 11/1986 |
| EP | 0 524 668 | 1/1993 |
| EP | 358 045 | 11/1993 |
| GB | 1597276 | 9/1981 |

* cited by examiner

ROTARY DISK CROP HARVESTING HEADER WITH AN AUGER AND IMPELLERS FOR CONVERGING THE CROP

This application is a Continuation of application Ser. No. 12/817,273 filed Jun. 17, 2010 which is now issued as U.S. Pat. No. 8,015,784.

This application claims the benefit under 35 U.S.C. 119 of Provisional Application Ser. No. 61/223,967 filed Jul. 8, 2009.

This invention relates to a crop harvesting header which has a cutter bar across the width of the header which carries and drives a plurality of transversely spaced rotary disks and particularly to an improved arrangement for transferring the cut crop inwardly from outer disks to a discharge opening.

BACKGROUND OF THE INVENTION

Crop harvesting headers which use rotary cutters in replacement for the more conventional sickle knife systems have been available for many years. It is well known that such rotary cutters include a cutter bar or gear train which provides the main structural and drive communication components of the cutter. The cutter bar provides a series of longitudinally spaced vertical drive members each of which drives a respective one of a plurality of cutting disks at spaced positions along the cutter bar. The disks are mounted for rotation about a vertical axis standing upwardly from the cutter bar. The disks carry at a point on their outer edge a plurality, generally two, of flail type blades which rotate with the disk around the vertical axis in a cutting action.

The construction of the cutter bar itself including the suitable gear train is well known and a number of different designs are available which can be used by a person skilled in this art.

Examples of such rotary type cutters are shown in the following documents.

U.S. Pat. No. 5,272,859 (Pruitt) issued Dec. 28, 1993 discloses a mower/conditioner including a cutter bar and rotating disks feeding to a rear discharge opening containing a pair of conditioning rollers. The outermost disk carries a generally cylindrical impeller in the form of an upright cylindrical cage. In front of the discharge opening is a series of disks arranged in counter-rotating pairs.

U.S. Pat. No. 5,463,852 (O'Halloran) issued Nov. 7, 1995 and U.S. Pat. No. 5,433,064 issued Jul. 18, 1995 (Schmitt) assigned to Hay and Forage Industries of Hesston both show a construction of such a rotary cutter system in which there is a series of the cutter disks at spaced positions across the cutter bar with, at each end, two of the cutter disks extend beyond a central area in front of a discharge opening. In this arrangement the two end disks are driven by a mechanical drive system. The two end disks each carry a rotary transfer element in the form of a series of posts arranged at the periphery of a cylinder surrounding a vertical axis standing upwardly from the disk. The transfer elements act to carry the crop material which is cut by the disks inwardly toward the discharge opening. A conventional crop conditioner in the form of a pair of counter-rotating rollers is mounted across the crop discharge opening.

U.S. Pat. No. 6,158,201 (Pruitt) issued Dec. 12, 2000 also assigned to Hay and Forage Industries discloses a modification to the above 852 and 064 patents of HFI where a crop transport roller is added in the crop discharge opening and is arranged to carry crop up to the nip of the conditioner rollers.

U.S. Pat. No. 6,581,362 issued Jun. 24, 2003 and U.S. Pat. No. 6,718,743 issued Apr. 13, 2004 (Rosenbalm) assigned to Deere and Company both disclose a rotary cutter system which has two end disks outboard of the central discharge opening with a conditioner arranged at the discharge opening for receiving the cut crop and providing a conditioning action. Over the end cutters is arranged an impeller system.

U.S. Pat. No. 6,768,865 (Rosenbalm) issued Jun. 23, 1998 assigned to Deere and Company discloses a rotary cutter system which has two end disks outboard of the central discharge opening with a conditioner arranged at the discharge opening for receiving the cut crop and providing a conditioning action. The conditioner can be either of a flail type or of a fluted roller type.

U.S. Pat. No. 5,852,921 (Neuerberg) issued Dec. 29, 1998 to Kuhn discloses impellers behind a row of cutting disks.

U.S. Pat. No. 4,809,488 (Neuerburg) issued Mar. 7, 1989 assigned to Kuhn discloses a rotary cutter system which has a frusto-conical cage as the impeller on an end disk where a drive shaft extends into the top of the cage.

EP 358,045 (Ungruh) assigned to Niemeyer Sohne GmbH published Nov. 3, 1993 discloses a mower which has at least four cutting disks arranged in two pairs rotating in the same direction and feeding to the center. Above each disk carries a cylindrical impeller which has a surface running inwardly to carry the crop towards the center. In the region between each of the disks of each pair is a further cylindrical impeller which assists in transporting the crops to the center.

German 32 24 170 (Mortl) published Dec. 29, 1983 discloses a header having a discharge opening behind the outermost cutters of a group which includes four cutters. The group is arranged in two pairs with each pair rotating in opposite directions. Thus the outer cutter of the group rotates inwardly. Outboard of this cutter is provided a further cutter which also rotates inwardly as shown by the arrows. This reference also includes a pair of impellers, each mounted on a respective one of the two outer cutters which act as a conveying device for carrying the crop inwardly. The impeller is generally an upwardly tapered element of triangular cross section.

EP 0 016 661 (Maier) published Nov. 12, 1986 and assigned to Deutz Fahr discloses a cutter bar formed by a series of cutting disks where the end two disks at one end each carry a respective cylindrical impeller for carrying the cut crop to a discharge opening where there is located a conditioner.

German 35 01 133 (Schulze-Selting) published Jul. 17, 1986 also assigned to Deutz Fahr discloses a cutter bar formed by a series of cutting disks where the end disk at one end carries a respective cylindrical impeller for carrying the cut crop to an opening and there is provided an intermediate suspended impeller over the next disk where the suspended impeller is frusto-conical.

U.S. Pat. No. 4,330,982 (Vissers) issued May 25, 1982 and assigned to Multiform discloses a series of rotary cutters with a pair of conditioning rollers which extend transversely or laterally across the mower narrower than the cutting zone and located in a discharge opening. An auger which forms a large center gathering auger behind the rotary cutters provides a flight on the auger defining two auger elements, one at each end, and moves upwardly and rearwardly from the cutting plane to the nip to convey the crop cut by the cutting disks to the nip. The cutters are arranged in three pairs with each pair rotating in opposite direction so as to tend to feed the material between the pair. Behind the pairs is located an auger type converging system which carries the cut crop over the auger tube while tending to move the crop material inwardly to the discharge opening. The overshot auger is mounted across the entire cutting width of the machine and is journalled in the side panels. The drive for the auger is located outside of the cutting zone. No stripper or rear pans are used to prevent crop wrapping and escape. No other feed devices such as drums are use in conjunction with the overshot auger.

U.S. Pat. No. 4,224,163 (Gantzer) issued Jan. 13, 1981 and assigned to Kuhn discloses a series of rotary cutters arranged in pairs with each pair rotating in opposite direction so as to tend to feed the material between the pair. On top of the end pair is located a vertical belt type converging system with an end roller coaxial with the end cutter and a second vertical roller spaced inwardly and rearwardly from the end roller so that the belt carries the cut crop inwardly to the discharge opening.

EP 0,524,668 (van der Lely) published Jan. 27, 1993 and assigned to Van Der Lely discloses a series of rotary cutters arranged in pairs with each pair rotating in opposite direction so as to tend to feed the material between the pair. Behind the end pair is located a rotary crop displacing member which carries the cut crop inwardly to the discharge opening. This is formed by a plurality of tines which extend radially from a horizontal shaft mounted along the line of travel and above the cutters. The end disk also carries a drum type impeller.

U.S. Pat. No. 2,906,077 (Hale) issued Sep. 29, 1959 discloses conditioner rollers in front of which are mounted a rotating roller which rotates to feed crop upwardly and rearwardly into the nip. Forwardly of the roller is located a sickle blade type cutter.

U.S. Pat. No. 3,014,324 (McCarty) issued Dec. 26, 1961 discloses a pair of conditioner rollers feeding into a nip therebetween. A roller is located in front of and below the nip of the conditioner roller and rotates in a direction to feed crop into the nip.

Canadian 2,166,671 (Savoie) published Apr. 6, 1997 discloses a disc cutter and a conveyor roller which feeds into the nip between a pair of conditioning rolls located in a discharge opening behind and narrower than the cutter.

US published Patent Application 2005/0126142 (Rosenbalm) now U.S. Pat. No. 7,165,381 assigned to Deere discloses three cage type impellers arranged across the outermost three disks where the bottom disk of the impeller is formed as a frusto-conical member converging upwardly and inwardly to the cage bars.

The 995 disk mower of Deere as disclosed in US published Patent Application 2008/0016837 (Rosenbalm) has a converging system of the type shown in the above patent of Rosenbalm which acts to carry the crop to the discharge opening where the conditioner when provided is located. When the conditioner is omitted, a vertical converging roller is mounted immediately inward of the outer edge of discharge opening with a textured outer surface to transport the crop material inwardly of the width of the discharge opening. A second roller is also provided which has its axis inclined upwardly inwardly across the top of the swath so as to attempt to act to compress the side edges of the swath downwardly and inwardly for improved consolidation. This arrangement is designed for an 8 or 10 disk machine but is ineffective at providing a properly consolidated swath of a required width.

U.S. Pat. No. 4,739,609 (Meier) published Apr. 26, 1988 discloses a conditioner rotatably arranged around a horizontal axis extending substantially across the width of the mowing rotors and arranged with its forward edge immediately behind the axes of the rotors. The conditioner includes a shaft with left and right pitched auger flights which join at approximately the longitudinal center of the shaft so that the cut hay is directed into a single narrow swath in the center behind the conditioner. Conditioning tools are secured along the outer edge of the auger flights and the conditioner is rotated in a direction causing an overshot movement of the hay from the mowing rotors.

British Patent 1,597,276 assigned to Multinorm BV published Sep. 3, 1981 discloses a tractor drawn rotary agricultural mower which has transverse auger behind the cutting rotors working inside a guard to carry the cut crop toward one end of the header to form a swath. The auger rotates in a direction so that the material passes underneath the auger and is confined by a pan to move upwardly and rearwardly.

U.S. Pat. No. 7,340,876 issued Mar. 11, 2008 which corresponds to US Published Application 2008/0066440 filed Sep. 15, 2006 and published Mar. 23, 2008 and to Canadian application 2,559,353 discloses an arrangement which provides impellers of an hour glass shape arranged at the outer cutter disks. The disclosure of this document is incorporated herein by reference.

U.S. Pat. No. 7,454,888 issued Nov. 25, 2008 which corresponds to US Published Application 2008/0066441 filed Sep. 15, 2006 and published Mar. 23, 2008 and to Canadian application 2,559,217 discloses an arrangement which provides a transfer roller between the cutter disks and the conditioning rollers where the transfer roller is of the same diameter as the bottom roll and carries high ribs preferably forwardly inclined for an aggressive action on the crop. The roller is mounted with its axis above the cutting plane and its uppermost edge of the ribs at or above the axis of the bottom roll. The disclosure of this document is incorporated herein by reference.

U.S. Pat. No. 7,356,982 issued Apr. 15, 2008 which corresponds to US Published Application 2008/0066439 filed Feb. 15, 2007 and published Mar. 23, 2008 and to Canadian application 2,578,907 discloses another arrangement which provides impellers of an hour glass shape arranged at the outer cutter disks. The disclosure of this document is incorporated herein by reference.

US Published Application 2009/0071116 filed Jul. 23, 2008 and published Mar. 23, 2009 which corresponds to Canadian application 2,639,032 discloses an arrangement where a swath converging apparatus is mounted in the mouth of the opening and is formed by two pairs of upstanding cylindrical rollers rotatable about their axes in a direction to carry the crop inwardly of the discharge opening. The pairs are mounted on respective top and bottom plates which pivot about the axis of the outer roller with the latter extending forwardly to overlap a floor plate of the cutter bar. The disclosure of this document is incorporated herein by reference.

In many cases the discharge opening contains a conditioner for engaging and breaking or fracturing the crop to improve drying action as the swath is left in the field. Such conditioners can be of a number of different types but one common type uses a pair of fluted rollers which form a nip so that the crop is bent as it passes between the flutes.

In a brochure issued by AGCO on Jul. 15, 2008 of the 9190 and 9192 ROTARY DISK HEADERS is disclosed on page 6 the use of small short "rear augers" at each end of the cutter bar which are defined as "located behind the crop cages which act to reduce crop build up behind the cutter bar. This allows crop to easily flow into the conditioner rolls, especially when cutting less than a full head width." This arrangement is shown and claimed in U.S. Pat. No. 7,726,108 (Pruitt) issued Jun. 1, 2010.

In Published US application 2008/0256920 published Oct. 23, 2008 by Aaron Yanke is disclosed a mower conditioner in which auger flight elements are located at the ends of the cutter bar for carrying the crop material inwardly to the pair of conditioning rolls.

SUMMARY OF THE INVENTION

It is one object of the invention to provide a crop harvesting header of the type having a series of rotary cutting disks on a cutter bar.

According to a first aspect of the invention there is provided a crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame including a discharge opening behind the cutter bar into which the cut crop enters so that the crop is discharged behind the discharge opening for forming a swath behind the header;

the discharge opening having ends which are spaced inwardly from ends of the cutter bar so that the discharge opening is narrower than the cutter bar;

at each end, the cutter bar having at least one outer cutter disk at least part of which is located outwardly of a respective end of the discharge opening;

at each end of the cutter bar there being provided a respective crop converging auger element arranged to receive crop cut by the cutter disks at the respective end of the cutter bar and arranged to move the crop inwardly toward the discharge opening, each auger element including a rotating surface with a flight on the surface;

each auger element being arranged generally longitudinal of the cutter bar with an outer end thereof spaced outwardly of the respective end of the discharge opening so as to carry the cut crop longitudinally of the cutter bar behind the cutter disks to the discharge opening;

each auger element forming a part of a common rotary member which extends across the discharge opening so that the common rotary member extends to a position located inwardly of the sides of the discharge opening;

the common rotary member including each auger element being arranged to rotate in a direction with a front face thereof turning upwardly and rearwardly;

wherein at each end of the cutter bar there is provided an impeller located at least partly outwardly of the respective outer end of the auger element.

In many cases the common rotary member is formed by a single tubular member extending across the full width from one auger element to the other and bridging the discharge opening. In other cases the common rotary member may include a support bearing at a position part way across the discharge opening so as to form two parts of the common rotary member with one of the two parts on each side of the discharge opening. The parts are connected by a coupling so that all parts including the two auger elements rotate commonly as a common element.

In some cases a part of the common rotary member is free from the flight.

In other cases the flight is arranged to extend along a full length of the common rotary member.

Preferably the impeller is carried on an outermost one of the cutter disks for rotation therewith.

Preferably there is provided a conditioning system located in the discharge opening.

Preferably the auger elements form part of a common auger member extending across the discharge opening.

Preferably there is provided a conditioning system located in the discharge opening including top and bottom rollers with a nip therebetween and the auger member is arranged such that a topmost tangent to an auger flight thereof is located above the axis of rotation of a bottom roll of the rollers and below the axis of rotation a top roll of the rollers for effective feeding from auger into the conditioner rollers.

Preferably each auger element is arranged with a forward-most tangent to an auger flight thereof located at or behind a rearmost extent of the cutter disks.

Preferably the impeller comprises a plurality of crop engaging elements at angularly spaced positions around an axis of rotation.

In the main embodiments described and used typically as preferred arrangements, the auger elements defined above form part of a common auger member. Such a common auger member forms a large center gathering auger behind the rotary cutters. Such a common auger member does not provide a pair of axially spaced apart, transversely extending, rotatable augers. Such a common auger member does not provide stub augers which are spaced apart.

The common auger member may include a common roller across its full width defining a support surface of the common auger member. However the member may also be formed without a roller and may be connected at positions along its length by a shaft or other connection without the roller being continuous. While the roller, if present, is preferably of a constant diameter, this is not necessarily so and the diameter may vary. The roller may carry auger flights at all positions along its length or one or more portions may be bare of the flight While the common auger member extends across the header substantially to the ends and extends across the discharge opening, it is not essential that it be formed in one piece and it can have two or more separate sections which are independently supported and/or independently driven.

While the embodiments described herein use the common auger member, the invention also contemplates and certain aspects include within their scope that the auger elements are separate independent items spaced apart and do not include a portion extending across the full width in front of the discharge opening.

The cutter bar may be formed a single piece driven from one end or may be formed in two or more sections.

Where impellers are used, these are typically of the type shown in previously mentioned U.S. Pat. No. 7,340,876 issued Mar. 11, 2008 which corresponds to US Published Application 2008/0066440 filed Sep. 15, 2006 and published Mar. 23, 2008 and to Canadian application 2,559,353 of an hour glass shape. Such impellers are commonly of the type using angularly spaced bars but can also be of the type which are formed by solid drums which may or may not have external crop engaging element s formed on the outside surface of the drum.

The conditioner defined herein may be or the type using a pair of fluted rollers defining a nip. However other types of conditioner can also be used. Also in some cases the header can be used without a conditioner so that the crop material is deposited directly onto the ground or collected.

While in most cases it is desirable to carry out conditioning of the crop in the discharge opening, in some case no conditioning of the crop is required on the header so that the crop is merely transferred by the auger elements to the discharge opening and is deposited in the discharge opening into a swath without utilizing any conditioning elements within the discharge opening. The swath may be converged within the discharge opening using the arrangement shown in US Published Application 2009/0071116 filed Jul. 23, 2008 and published Mar. 23, 2008 which corresponds to Canadian application 2,639,032. The disclosure of the components in the discharge opening of this application are incorporated herein by reference.

The frame as defined herein can include both structural beams and other such frame elements and may also include panels and sheets which do not contribute to the structural strength of the header.

BRIEF DESCRIPTION OF THE DRAWINGS

In the drawings like characters of reference indicate corresponding parts in the different figures.

DETAILED DESCRIPTION

Figure 1:
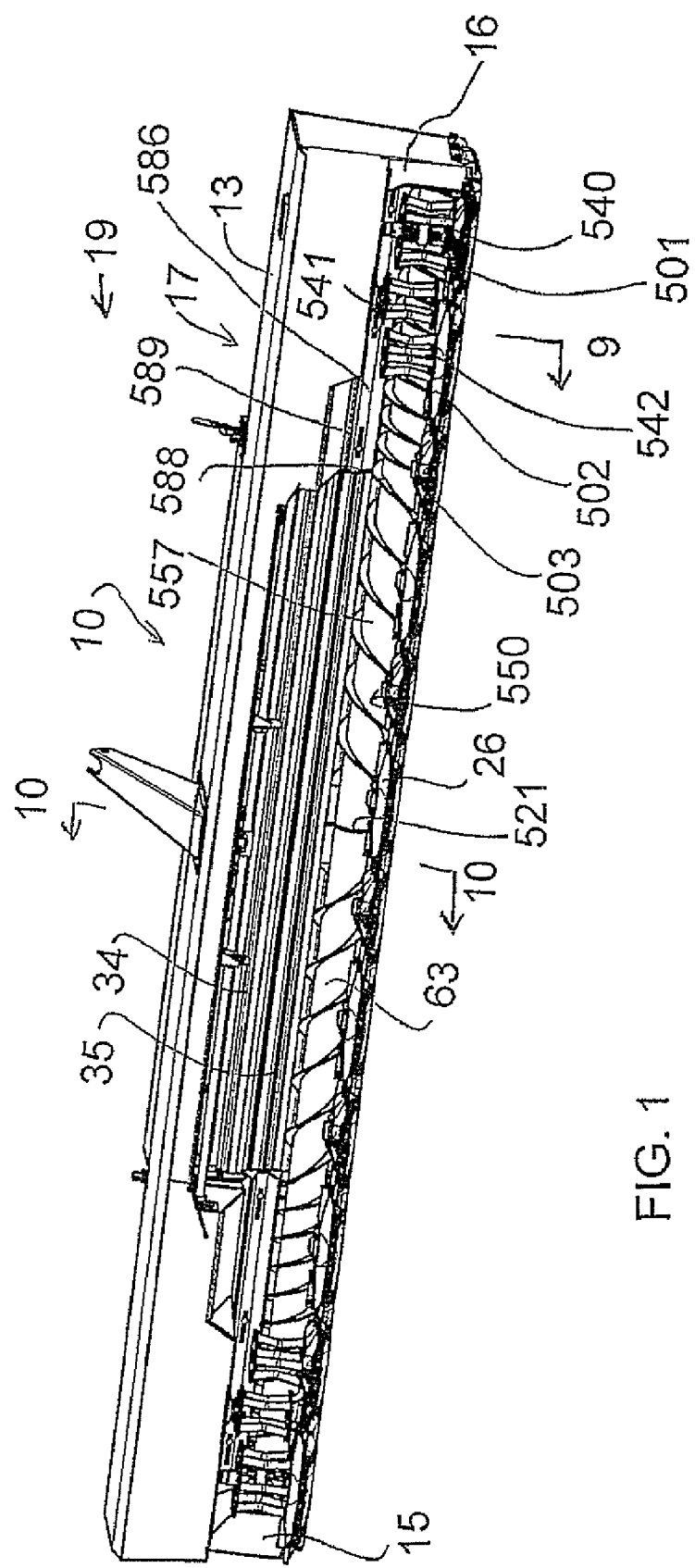
FIG. 1 is an isometric view of a header according to the present invention.

In FIG. 1 is shown schematically a header for attachment to conventional swather tractor of the well known type having driven ground wheels and rear castor wheels.

An alternative arrangement can be of the pull-type for towing behind a tractor and the construction of the hitch and support wheels of such a device is well known to a person skilled in this art.

A front support assembly of the tractor carries the header 14 including left and right lift arms which carry the header in a floating action across the ground along skid plates (not shown) of the header. The header includes side walls 15 and 16 forming part of a frame 17 attached to the conventional transport system of the tractor. The frame carries top covers 18 which support a front skirt 19 in front of the cutter bar.

The frame 17 includes a main transverse beam 17A which is attached to the tractor. The main beam carries the side walls 15 and 16. The side walls each comprises a vertical wall extending forwardly to a front edge 23 in front of the cutter bar 24. The side wall is vertical and the front edge 23 lies in a vertical plane of the side wall so as to confine crop material to the interior of the header between the side walls for cutting action effected by the cutter bar 24.

Within the cutter bar 24 is provided a gear train (not shown) of meshing gears carried on suitable bearings so as to provide communication of drive of a number of vertical shafts carried on the cutter bar each for rotating a generally horizontal disk 26 about a vertical axis of the shaft. The disks are substantially identical. The disks are generally elliptical in shape so that a length between two ends 26A and 26B (FIG. 2) is significantly greater than a distance between the side edges in a direction at right angles to the length. At each of the ends 26A and 26B is mounted a respective one of a pair of flails 27 each for pivotal movement about a flail mounting pin 27A. The mounting pins are arranged at the ends and thus at the maximum extent of the disk so that the flails project outwardly beyond the edges of the disk for rotation in a common horizontal cutting plane generally parallel to the plane of the cutter bar in a cutting action.

The disks are intermeshed so as to driven synchronously and they are arranged at 90° phase difference so that adjacent pairs of the disks are at 90° offset as they rotate to avoid interference between the disks and the blades 27 carried thereby.

The cutter bar of this general construction is of a conventional nature and many examples of a commercial arrangement of this type are available in the market place. Thus the details of the cutter bar and its mounting are well known to one skilled in the art and further details can be obtained from such commercial devices.

The cutter bar 24 is wider than a discharge opening 30 with an entrance mouth 30A defined in a back sheet 30B forming a vertical rear panel of the header behind the cutter bar. A conditioning system 31 is mounted in the discharge opening 30. Thus the crop material passes over and between the disks when cut and also must be converged from the full cut width into the entrance mouth 30A of the discharge opening 30.

Figure 2:
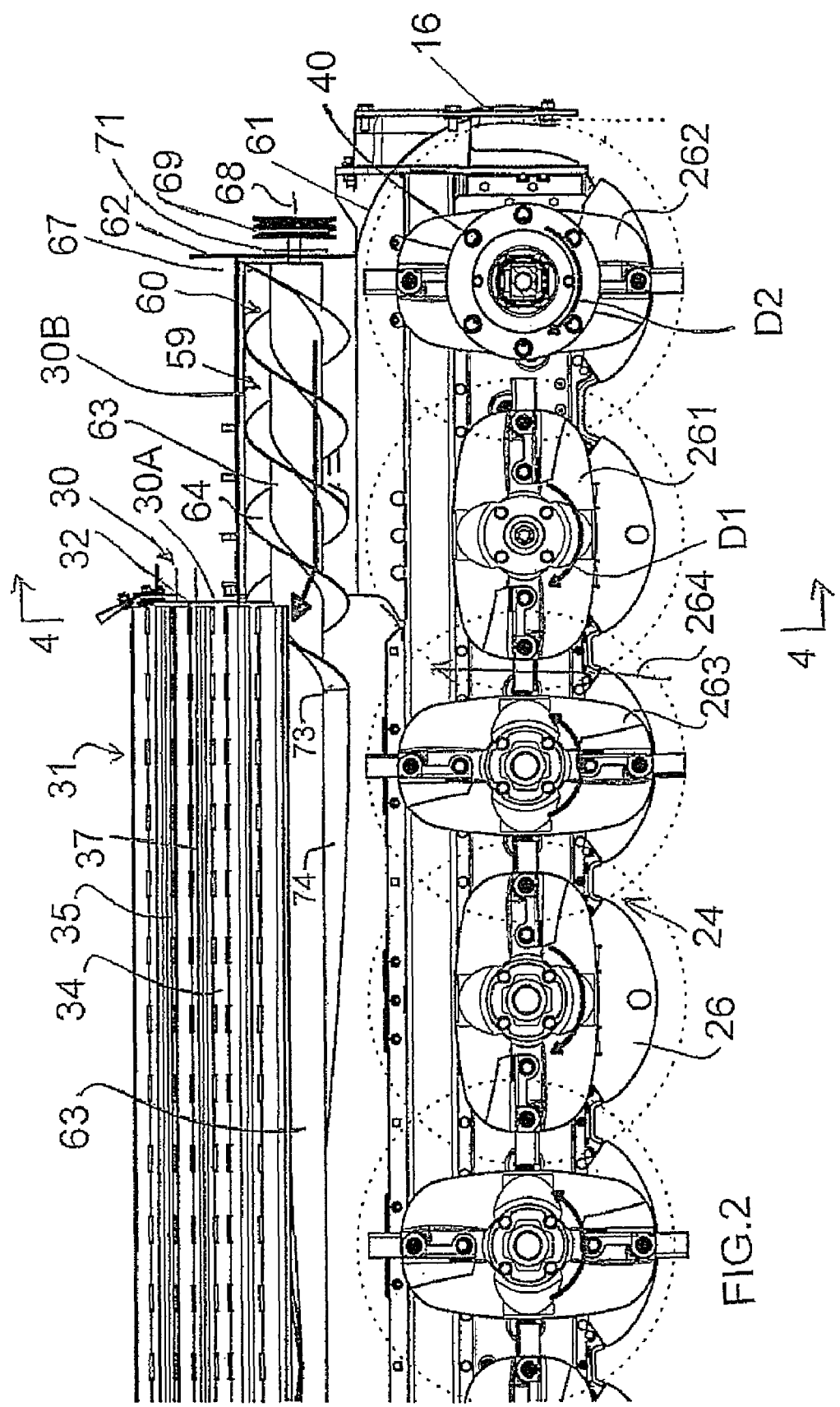
FIG. 2 is a top plan view of the end of a header similar to that of FIG. 1.
Figure 3:
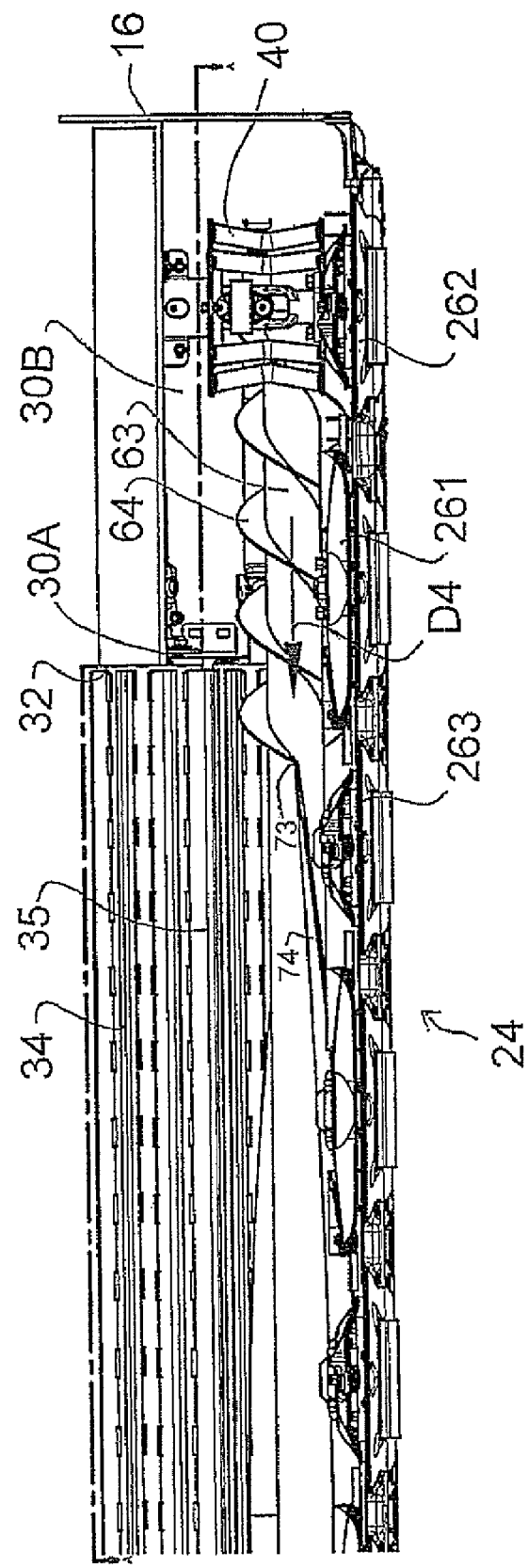
FIG. 3 is a front elevational view of the end of the header of FIG. 2.
Figure 4:
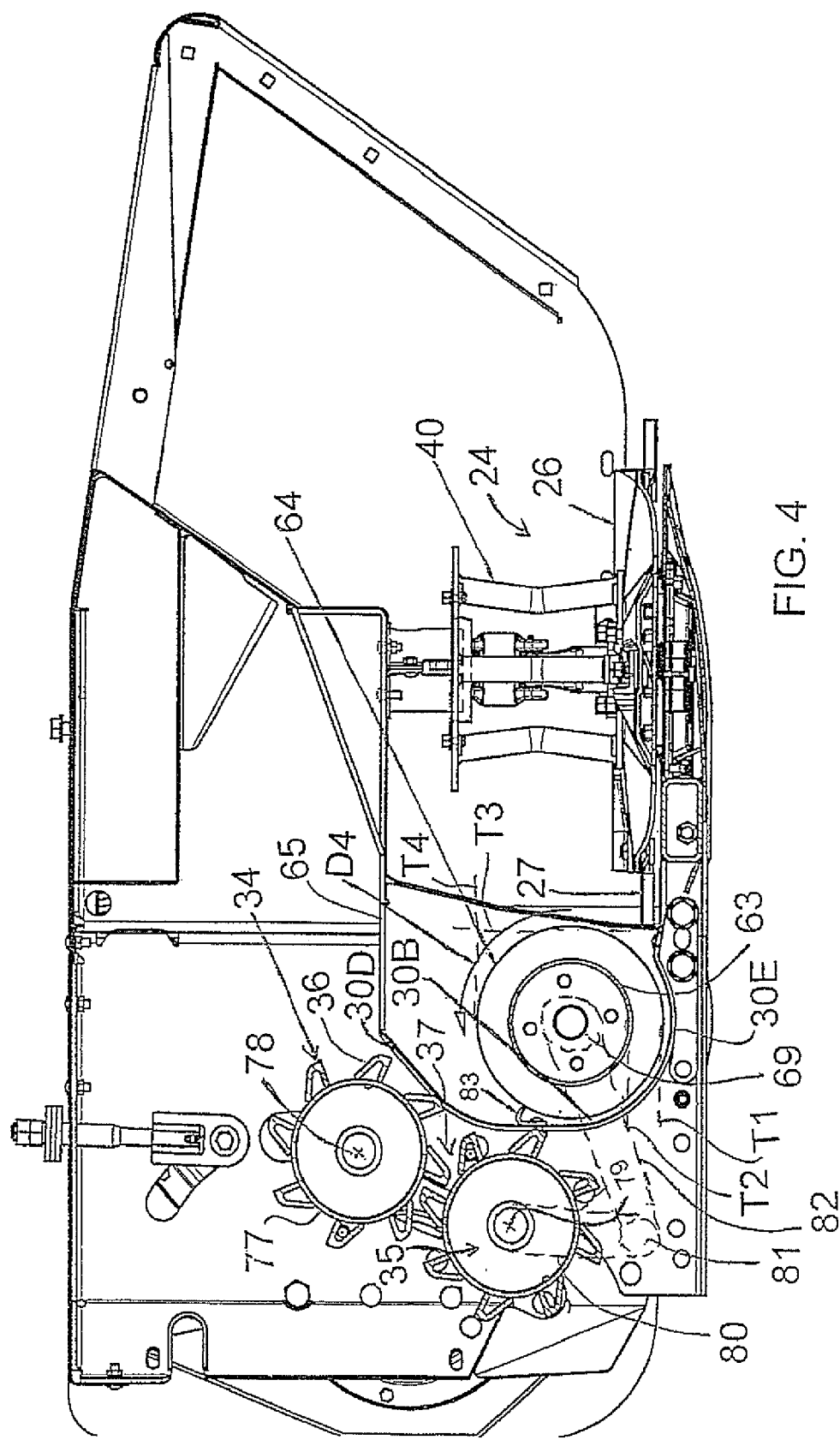
FIG. 4 is a cross sectional view of the header of FIG. 2 taken along the lines 4-4.

In FIGS. 2, 3 and 4 only one end of the header is shown but it will be appreciated that the opposite end is identical and symmetrical to the end shown.

The discharge opening has side walls 32 which are vertical and parallel and extend rearwardly from the mouth 30A and which confine the crop material to pass through the discharge opening over a width less than the width of the header so that the side walls 32 are spaced inwardly from the respective end walls 15 and 16 of the header. The crop conditioning system 31 is arranged to span the width of the crop discharge opening so that the width of the conditioning system is equal to the width of the discharge opening. The conditioning system comprises a top roller 34 and a bottom roller 35 which have flutes 36 arranged in a meshing arrangement so that the crop material passing through the discharge opening passes through a nip 37 between the conditioning rolls and is discharged from the rear of the conditioning system as a swath of material to be discharged onto the ground or to be collected as required.

The disks 26 mounted on the cutter bar 24 include a series of disks which are located in front of the discharge opening 30. Outward of these disks and either side is provided a pair of outer disks indicated at 261 and 262 with the disk 262 outermost. These disks are arranged to rotate inwardly as indicated by arrows D so that the front extremity and the blade carried thereby rotates in the direction indicated at the arrows D as shown in FIG. 2 to carry the crop material which is cut by those disks inwardly toward the discharge opening.

The disk 262 only and not disk 261 carries an impeller 40 mounted on the disk so as to be carried thereby and driven thereby and so as to be directly co-axial with the disk 262. A hanging impeller can be used to replace this impeller also co-axially arranged with the corresponding disk 262 or the axis of the impeller may be offset from the axis of the disk. It will be appreciated that the disk and the impeller co-operate to assist in carrying the crop material inwardly toward the discharge opening and to resist the crop material from moving rearwardly over the disks 262 to the rear bulkhead panel 30B which could cause collection of the crop material and eventual blockage of the system.

The arrangement and construction of the impeller is described in detail in the above US Published Application 2008/0066439 and Canadian application 2,578,907, the details of which are incorporated herein by reference and to which reference may be made for those details.

The top conditioning roller 34 is located above the bottom conditioning roller 35. These define between them the nip 37 through which the crop material is controlled to pass. The top conditioning roll 34 and the bottom conditioning roll 35 are parallel and arranged such that the crop passes through the nip 37 between the top and bottom conditioning rolls. The top and bottom conditioning rolls are arranged such that the nip 37 is raised above the common cutting plane and is located behind the disks 26. The top and bottom conditioning rolls 34, 35 each comprising a cylindrical body 77, mounted for rotation about an axis 78, 79 thereof. In one example, on the cylindrical body 77 is mounted a series of longitudinally extending, angularly spaced flutes 36 arranged such that the flutes 36 of the top roll 34 mesh with the flutes of the bottom roll 35 in the conditioning action, as is well known.

However the present invention is also applicable to conditioning rolls of the type which have no flutes or ribs so that the conditioning action is effected by a high crushing force between two plain rollers. The rollers can be smooth or may include grooves or indentations which are not intended to mesh in the crushing action. Crushing conditioner rolls of this type are well known to persons skilled in this art and different designs may be selected and used as will be known to such persons.

Figure 5:
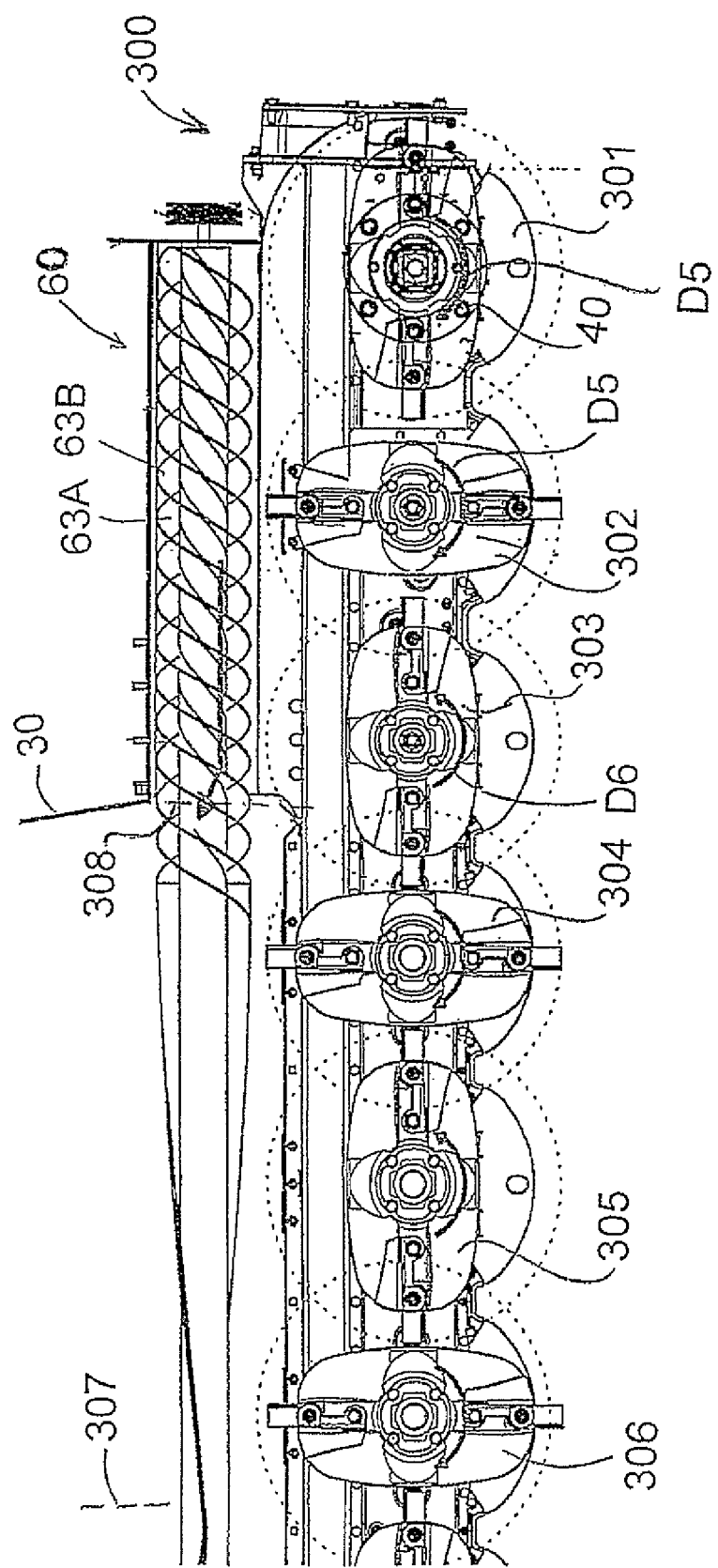
FIG. 5 is a top plan view of an alternative embodiment of the header of FIG. 1 showing a larger number of disks and showing a double start auger element and showing an arrangement with no conditioning.

In addition the present invention can be used in an arrangement in which the conditioning rollers are omitted so that no conditioning occurs in the discharge opening as shown in FIG. 5.

In a ten or twelve disk mower, in front of the discharge opening there are located eight of the cutter disks arranged in four pairs of disks with each pair arranged to rotate in opposite directions such that the crop tends to pass between the pair of disks.

Narrower machines of the type typically used in Europe or other countries where smaller machines are more suitable may have only three pairs of disks in front of the discharge opening.

The pairs of the cutter disks in front of the discharge opening include a first end disk 261 located in line with the first end wall 32 of the discharge opening and a second end disk (at the opposite end not illustrated) located in line with the second end of the discharge opening. That is an imaginary line 32A extending forwardly from the end 32 intersects the disk 261. This is typically located at a position thereon spaced inwardly from its axis but can be outside the axis of the disk 261. The axis and main body of the end disks 261 are mounted outboard of the imaginary line 32A of the opening so that the next adjacent disks define a cutting circle which is closely adjacent or at the line. Thus the majority of the end disks 261 are outboard of the respective line 32A.

The end disk is arranged to rotate so that a front of the first disk 261 moves outwardly of the respective end of the discharge opening as marked at direction arrow D1. A first outer disk 262, which is mounted outwardly of the end line of the discharge opening and outwardly of the end disk rotates in the same direction as the disk 261 as indicated at D2. A third disk 263 inward of the disk 261 rotates in a direction opposite to the disk 261 so as to form a pair with the disk 261 such that at least some of the crop tends to be swept into a first zone between the first pair of disks 261, 263 and to pass through that zone as shown schematically at arrow 264.

A crop converging structure 59 is located behind the disks 261 and 262 and tends to move the crop inwardly toward the discharge opening 30. The crop converging structure 59 comprises an auger element 60.

It will be noted that the two outer disks 261 and 262 both rotate in the direction of the arrows D1 and D2 so as to turn inwardly toward the discharge opening. This causes additional crop to be passed into the zone between the disks 261 and 263.

As best shown in FIG. 2, the end disk 262 is located immediately adjacent the end wall 16 of the header. The end wall 16 is connected to a connecting wall 61 which is curved around the path of the cutting blade 27 of the end disk 262 so as to extend inwardly and rearwardly from the end wall 16 to a recessed end wall 62 spaced inwardly from the end wall 16. Thus the wall 62 is located at a position spaced inwardly from the end of the header. Behind the end wall 62 is provided the rear bulkhead 30B which extends inwardly at right angles to the end wall 62 up to the entrance mouth 30A of the discharge opening 30. The rear wall 30B is spaced rearwardly from the rear edges of the path of travel of the cutting blades by a distance equal to the length of the recessed end wall 62. This provides a region for the auger element 60 which acts as a converging member for converging the crop behind the end cutters 261 and 262.

The auger element 60 comprises an auger tube 63 and an auger flight 64 carried on the tube. In the embodiment of FIGS. 2, 3 and 4, the auger flight 64 is a single auger flight shaped such that rotation of the auger tube in the direction D4 acts to lift the crop upwardly and over the auger element as an overshot auger while at the same time the helical angle of the flight 64 acts to carry the crop on top of the auger tube inwardly toward the discharge opening 30.

As best shown in FIG. 4, the rear wall 30B behind the auger element includes an upper part 30D which curves upwardly and forwardly to connect to a top wall 65 of the header construction which extends over the cutting area and over the cutter bar 24. Also the rear wall 30B underneath the auger 60 curves forwardly in a part cylindrical shape as indicated at 30E so as to wrap around the outer edge of the periphery of the flight 64. This portion 30E thus forms a pan underneath the auger and extending to a forward edge 66 which is located just behind the rear tip of the blade 27. Thus the upper part of the auger and the front of the auger are exposed to the crop and the pan extends only to the rear and underneath.

The auger flight 64 has smooth outer edges so that it provides no cutting or grasping action on the crop allowing the auger flight to merely act as a transfer member carrying the crop inwardly as the helical flight rotates.

Typically the diameter of the tube 63 can lie in the range 100 to 200 mm. The height of the auger flight would lie in the range 25 to 50 mm. In a typical example therefore the tube is of 150 mm diameter and the flight is of 40 mm height. The tangent at the bottom of the flight as indicated at T1 is located at a height slightly below the cutting plane but is the bottom edge of the blade. However this position may be slightly raised so that it is located directly at the cutting plane defined by the sharpened edge or it may be even slightly above that cutting plane. The bottom tangent T2 of the tube is above the cutting plane. The forwardmost tangent T3 of the flight is located substantially at the rear edge of the blade 27.

The tube 63 is continuous along the header from a first end 67 at the end wall 62 to a second end (not shown) arranged as a mirror image to the arrangement illustrated in the figures. Thus the tube is a single elongate member which rotates around an axis 68 driven by a drive pulley 69. Bearings for the auger tube 63 are shown at 71 and are carried on the end wall 62.

The auger flight 64 is arranged so that it causes movement of the crop engaging the tube 63 in the direction of the arrow D4. The flight 64 extends from the end 67 through to a second end 73 of the flight located inward of the end wall 32 of the discharge opening and therefore inwardly of the entrance mouth 30A of the discharge opening. At the end 73 the flight is bent to form a second flight section 74 which is arranged at a much shallower helical angle so as to extend substantially longitudinally of the tube 63 in the central area of the discharge opening 30. The flight section 74 is arranged at a very shallow helical angle so as to provide little or no transverse movement in this area and to act instead as a feeding flange acting to engage the crop and tending to assist the movement of the crop into the discharge opening and into the nip 37 between the conditioning rollers.

As shown, therefore, in FIG. 2, the auger element is located behind the rear edge of the blades 27 of the cutting disks within the recessed area defined by the recessed end wall 62 and the rear wall or bulkhead 30B. The cut crop thus moves rearwardly from the cutting action of the blades so that portions of the crop engage onto the auger element and particularly the auger tube 63 so the flight carries the material inwardly and rearwardly in the direction of the arrow D4. Thus the auger element is located substantially behind the end impeller 40 on the end disk 262. The front of the auger may be behind, tangent to or overlap the rear of the cutting path.

The location of the end 67 of the auger element at a position spaced inwardly from the end wall 16 allows the positioning of the drive elements and bearings well within the extent of the frame as defined by the end wall 16. This area therefore provides space for the drive elements without the necessity for these elements projecting beyond the end wall 16. The transfer of the crop material to the discharge opening 30 is effected by a co-operation between the rotation directions of the cutting disks 261 and 262 together with the operating action of the impeller 40 and also the transfer action of the auger element itself. The auger element is located in front of the conditioning rollers so that the auger element can extend to a position where the flight 64 is located directly in front of the conditioning rollers allowing the crop material to turn at an angle significantly less than 90° to enter the nip 37 between the conditioning rollers. Thus there are no sharp turns involved in the movement of the crop as it is transferred from the area behind the disks 261 and 262 into the area of the nip 37.

As shown in FIG. 4, the drive to the bottom roller is effected by a belt or chain 80 which is driven from a drive member 81. The same drive member carries a second pulley or drive sprocket which drives a second belt or chain 82 acting to drive the pulley 69. In this way a simple drive arrangement for the conditioning roller system and for the crop transfer system defined by the auger elements can be located simply behind the cutter bar in the area within the bounds of the side walls 15 and 16 using simple components which are resistant to wear and breakdown.

As shown in FIG. 4, a topmost tangent to the auger flight indicated at T4 is located above the axis 79 of the bottom roll of the conditioning rollers but below the axis 78 of rotation of the top roll of the conditioning rollers so as to be located immediately adjacent the nip 37 for effective feeding of the material from the top of the tube into the nip 37.

A stripper member 83 is mounted on the rear wall 30B at positions outwardly of the entrance mouth 30A and projects forwardly from the rear wall 30B so as to provide a forwardmost edge in contact with or immediately adjacent the outer periphery of the flight as the flight rotates. The stripper member thus provides a surface which prevents crop from entering the area between the auger flight and the pan 30E. This arrangement therefore helps in preventing any wrapping of the crop around the auger elements and particularly the auger tube. The auger flight 64 terminates at the end 73 which is located just inside the mouth 30A. However the auger flight 64 can extend to a position closely adjacent the middle of the header that is midway across the conditioning rollers. In this area the auger flight acts to assist in spreading the material from the area outside the discharge opening, across the discharge opening so as to tend to even out the crop material across the width of the discharge opening.

As shown in FIG. 5, there is shown an alternative arrangement of the header which is a twelve disk header so that, starting at the outer end, there are disks 301, 302, 303, 304, 305 and 306 extending to the center 307 of the header with a symmetrical arrangement of disks extending to the opposite end (not shown). The disks 301 and 302 lie wholly outward of the discharge opening 30 and the imaginary line 308 at the side of the discharge opening. In this embodiment only the end disk 301 carries an impeller 40. The disk 303 is arranged so that it intersects in imaginary line 308 with the axis of that disk 303 lying outside the line. In this arrangement the disks 301 and 302 turn inwardly as shown by arrows D5 and the disk indicated at 303 rotates in a direction outwardly of the header toward the end as indicated at arrow D6. The rotation of the disk 303 in the outward direction causes the rear of the disk to move inwardly and thus cooperate with the auger 60 in carrying the crop inwardly behind the disks to the discharge opening. A more aggressive auger element is provided which has a two-start flight as indicated at 63A and 63B. This arrangement of double flight or multi-start flight may used on all arrangements and is shown to increase capacity.

Figure 6:
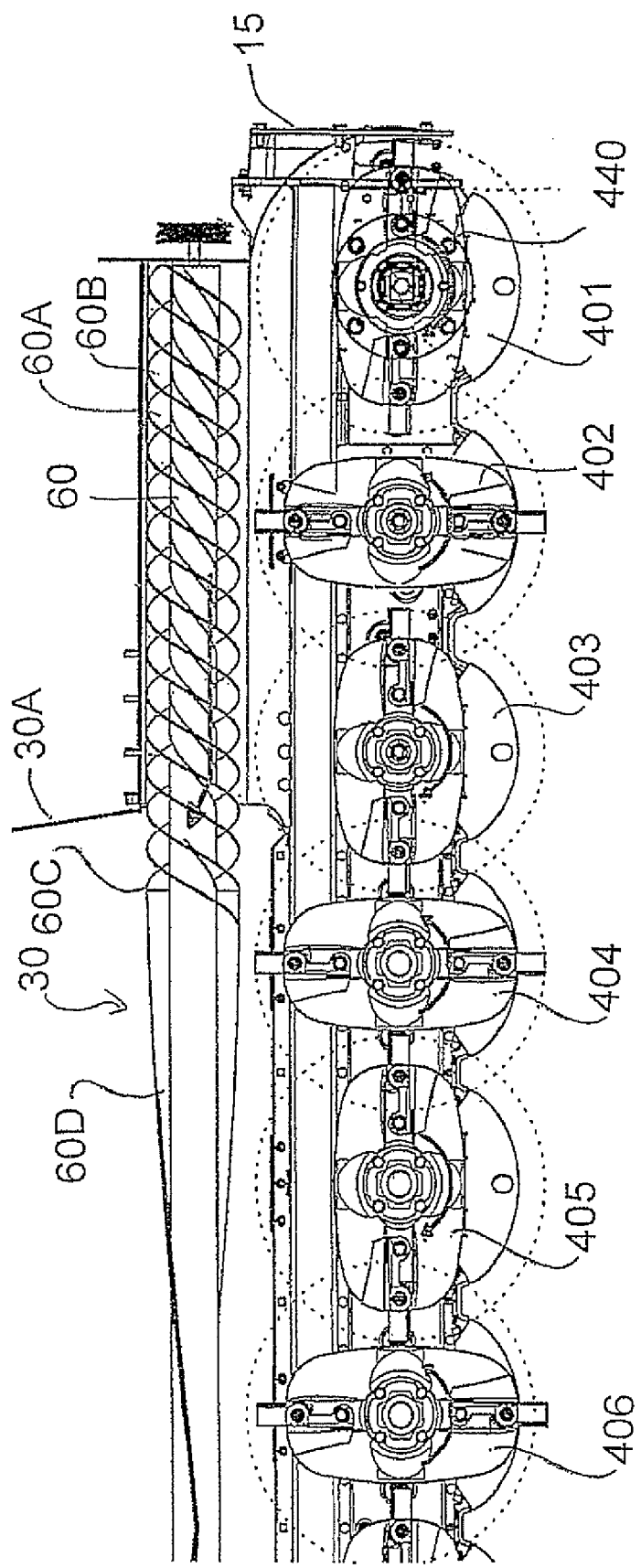
FIG. 6 is a top plan view of an alternative embodiment of the header of FIG. 1 similar to FIG. 5 showing an alternative disk rotation pattern.

As shown in FIG. 6, there is shown a further alternative arrangement of the header which is a twelve disk header with disks 401, 402, 403, 404, 405 and 406 on one side and a symmetrical arrangement on the other side. Thus there are additional disks 401 and 402 outward of the discharge opening 30. Again the end disk 401 only carries an impeller 440. In this arrangement the disks 401 and 403 turn inwardly and the disk 402 rotates in a direction outwardly of the header toward the end disk 401 carrying the impeller 40. Thus all of the disks across the header are arranged in co-operating pairs tending to force crop between the pairs as the pairs rotate inwardly toward one another. In this arrangement the crop fed between the disks 401 and 402 must be carried by the auger flight on the auger element 60 inwardly to the discharge opening without the assistance of the rotation of the disk 403.

Figure 7:
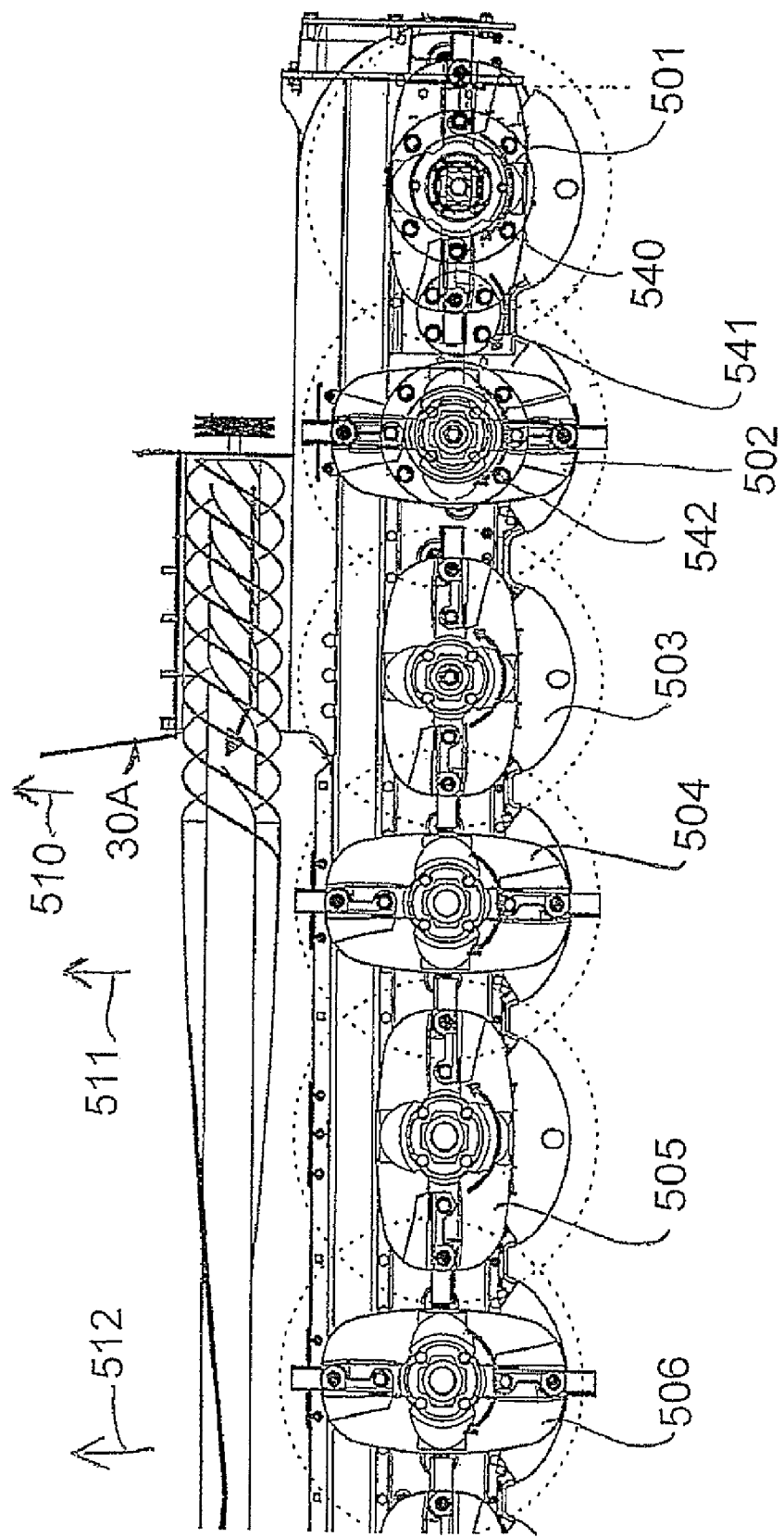
FIG. 7 is a top plan view of an alternative embodiment of the header of FIG. 1 similar to FIGS. 5 and 6 showing a further alternative arrangement which uses a construction with two outermost disks having impellers and an auger element behind the third disk.

As shown in FIG. 7, there is shown a further alternative arrangement of the header which is a twelve disk header with disks 501, 502, 503, 504, 505 and 506 on one side and a symmetrical arrangement on the other side. Thus there are additional disks 501 and 502 outward of the discharge opening 30. In this case there are three impellers 540, 541 and 542 where the impeller 540 is located on the end disk 501, the impeller 542 is located on the next disk 502 and the impeller 541 is a hanging impeller between the two impellers 540 and 542. In this arrangement the disks 501 and 502 turn inwardly and the disk indicated at 503 rotates in a direction outwardly of the header toward the end disk 501 carrying the impeller 540. A short auger element is located such that it starts behind the disk 502 and extends to the entrance mouth 30A. Thus in FIG. 7 there is a five stream pattern of material passing from the disks into the conditioning system or the discharge opening. This includes streams 510, 511 and 512 together with two further streams (not shown symmetrical to the streams 510 and 511 on the other side of the center stream 512. In these streams the material from three disks 501, 502 and 503 enters at stream 510, the material from two disks 504 and 505 enters at stream 511 and the material from two disks 506 and the next adjacent disk enters at stream 512. These streams tend to balance the material across the width of the discharge opening for improved operation of the machine.

In FIG. 1 is shown an isometric view from the front of the header of FIG. 7. In this arrangement however the auger elements extend to a position close to the end wall 15, 16 as shown in FIG. 6 rather than of the shorter construction shown in FIG. 7.

Thus in all of the construction shown, there is provided auger elements which extend to or commence at a position close to but spaced inwardly of the respective end wall and extend to a position located inwardly of the sides of the discharge opening. While the auger elements can be individual elements as described previously, it is much preferred that they form part of the common auger member extending across the discharge opening. This allows the auger member to be driven from one end and thus to provide common rotation to both elements which are located behind the outboard disks to effect the inward movement. Thus as shown for example in FIG. 6, each auger element 60 carries an auger flight construction which is of a multi-start construction so as to provide two separate flight members 60A and 60B side by side across the auger element. At a position 60C, the auger flights 60A and 60B change in pitch from a relatively short pitch of the order of 6 to 9 inches per 360 degree rotation around the support tube to a much longer pitch at flight member 60D of the order of 18 to 24 inches per 360 degree rotation around the support tube, or even longer.

The position 60C where the conversion occurs can be at the mouth 30A or it is preferred to be slightly inward of the mouth. Locating the position 60C inward of the mouth acts to cause the crop behind the disks to be carried inwardly beyond the edge of the discharge opening into the discharge opening for an improved spreading of the crop material across the width of the discharge opening.

In the center section at the discharge opening, the common auger member carries the auger flights 60D at longer pitch so that there is little tendency to move the crop transversely but the flights act to feed the crop rearwardly from the cutter disks to the conditioning rollers. Thus the auger element rotates in a direction with a front face thereof turning upwardly and rearwardly. The flights in the center section may have parts which are parallel to the axis so that they do not extend helically.

While the common auger element extends across the header substantially to the ends and extends across the discharge opening, it is not essential that it be formed in one piece and it can have two or more separate sections which are independently supported and independently driven.

Figure 8:
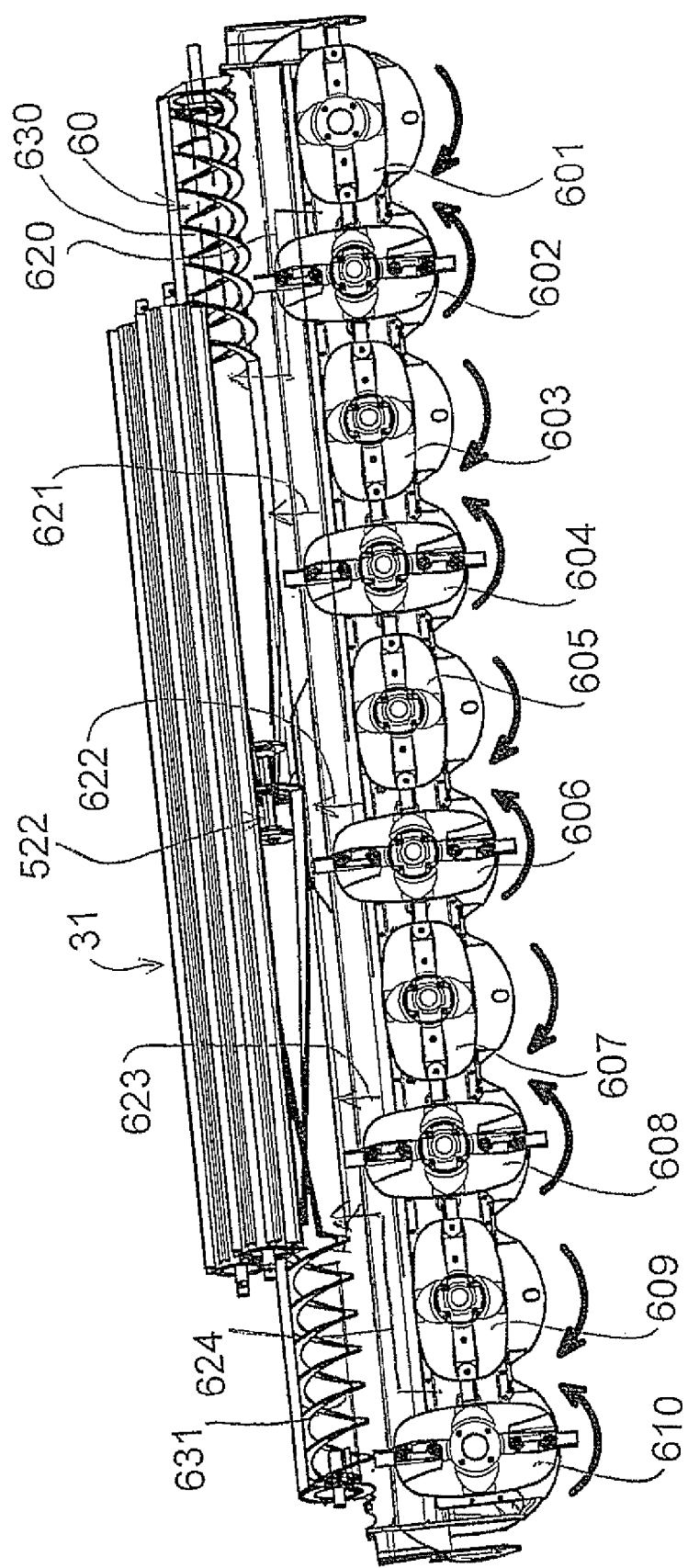
FIG. 8 is a top plan view of alternative embodiment of the header of FIG. 1 similar to FIGS. 5, 6 and 7 showing a further alternative arrangement of 10 disks.

In FIG. 8 is shown a further rotation pattern of a 10 disk machine including disks 601 to 610. These are arranged in pairs with each pair rotating toward one another so as to form streams 620 to 624 where each stream includes the material from two disks. This again balances the material cross the conditioner 31. The streams 620 and 624 are carried from the end pair of disks across the auger elements 630 and 631.

Figure 9:
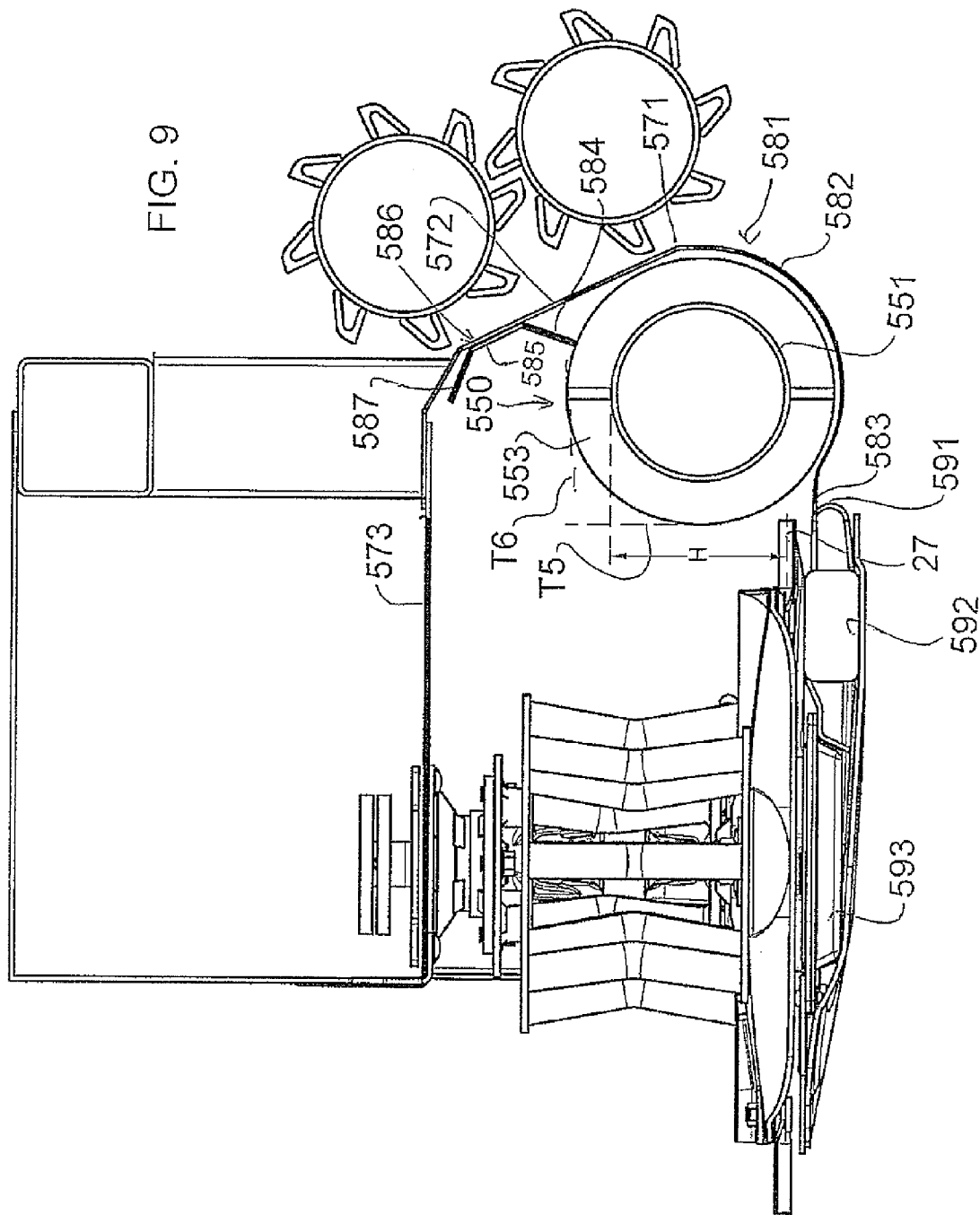
FIG. 9 is a cross sectional view along the lines 9-0 of FIG. 1.
Figure 10:
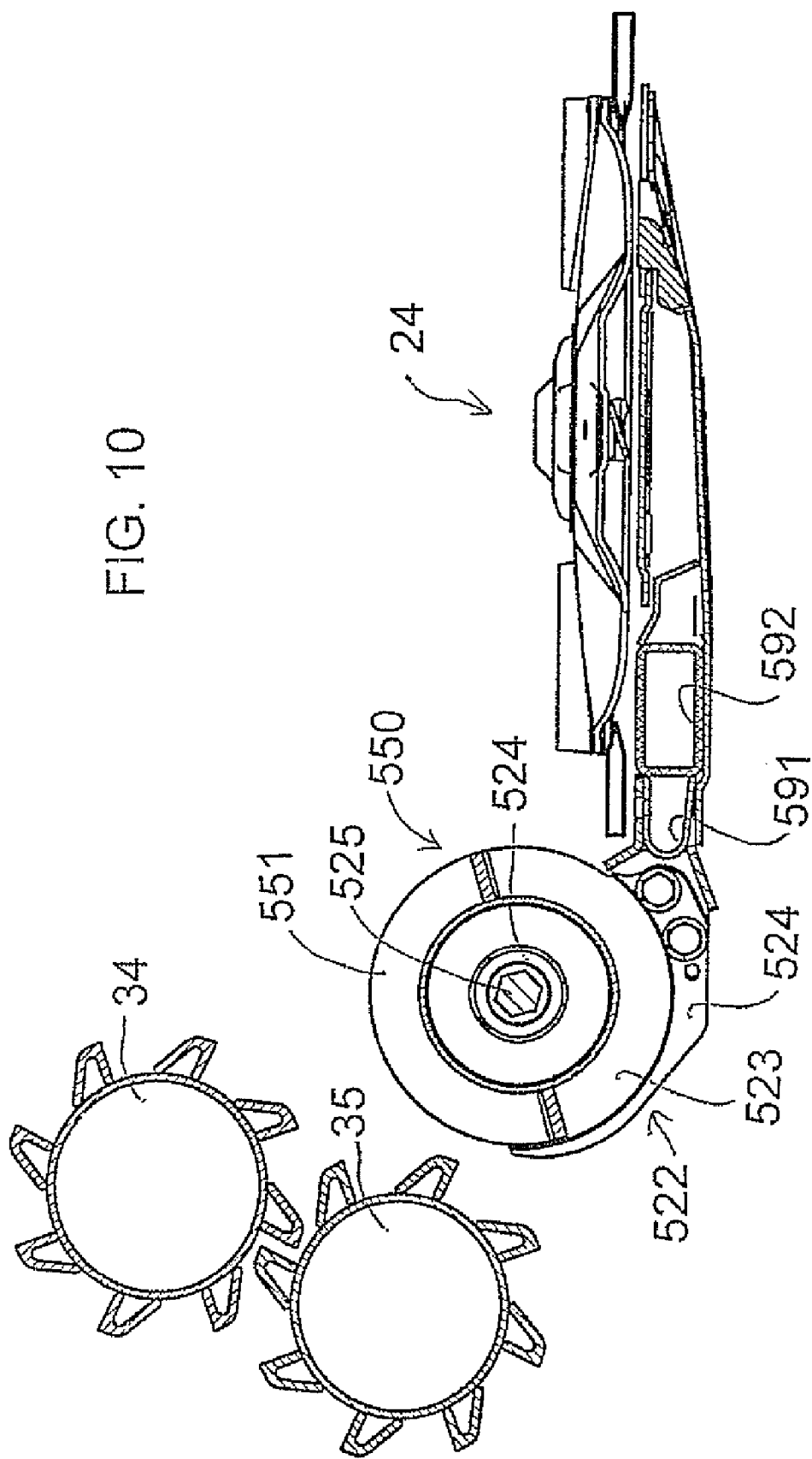
FIG. 10 is a cross sectional view along the lines 10-10 of FIG. 1.

Turning now to the cross sections of FIGS. 9 and 10, these show basically the same construction as shown in FIG. 4 but the construction is modified in a number of respects as described herein.

It will be noted that the common auger member 550 with a tube 551 and a flight arrangement 553 is arranged with a forwardmost tangent T5 to the auger flight 553 thereof located at or behind a rearmost extent of the cutter disks also lying on the line T5. Also it will be noted that the common auger member 550 has a diameter of the roller portion 551 which is less than 20 cms (7.5 inches) and typically less than 15 cms.

Further it will be noted that the header frame provides, on each side of the discharge opening, the components 581 mounted behind the auger element 550. These comprise the pan 582 which extends from a front edge 583 underneath the auger element 551 at approximately the 7.00 position around the element to an upper edge 571 at which the pan includes a portion 572 which extends at an angle upwardly and forwardly to an upper wall 573 closing the chamber behind the cutter bar.

Thus the pan forms a part-cylindrical surface 582 at a diameter slightly larger than the outer edge of the flight 553 so as to cooperate with the lower rear quadrant of the auger element 550. Thus the feed pan is shaped for minimal clearance relative to the auger element. Thus the feed pan extends to a front end behind the cutter disks at or just in front of the axis of the auger element at the 6.00 or 7.00 position and to a top end at a height approximately equal to the axis of the auger element at the 3.00 position.

The pan 582 extends forwardly to its front edge 583 which is fastened to a flange member 591 attached to a structural support beam 592 of the cutter bar behind the gear case 593 of the cutter bar.

A stripper rib or stripper member 584 is located at a position approximately at the 1.00 position and extends along the full length of the auger element at that part thereof outwardly of the discharge opening at a position rearwardly and downwardly of the topmost tangent T6 of the auger element and defines a surface extending outwardly away from the surface of the respective auger element approximately at right angles to the tangent to the point of intersection with the auger flight.

The auger member 550 is lowered relative to the embodiment of FIG. 4 so that a tangent T5 to the top of the rotating surface is at a height H no greater than 20 cms (7.5 inches) above the cutting plane of the cutting blade.

There is provided for each auger element a guide surface 585 in front of the portion 572 of the pan 582 and located outwardly to a respective side of the discharge opening. This is located so that material from the auger element is discharged onto the guide surface by the stripper member 584 for carrying crop discharged from the auger element inwardly toward the discharge opening. The guide surface 585 forms the base of a channel member 586 with the stripper member 584 forming one side and a second inclined surface 587 forming an opposite side. The guide surface 585 and the channel 586 extend along the auger element in the area outwardly of the discharge opening to an inner edge 588 (FIG. 1) at the discharge opening in front of the conditioning rolls of the conditioner 31. The channel 586 is mounted on an adjustable slide support 589 (FIG. 1) so that the position of the edge 588 is adjustable inwardly and outwardly of the side of the discharge opening. Typically the edge is located inward of the edge of the discharge opening but the amount of projection of the edge 588 into the discharge opening can be adjusted so that the point of discharge of the material stripped from the auger element can be adjusted. The channel 586 and the surface 585 are located in front of the nip of the conditioner rolls and are therefore movable to different positions along the nip.

The stripper member 584 thus extends along the auger element at a position rearwardly and downwardly of a topmost tangent of the auger element and defines a surface extending outwardly away from the surface of the respective auger element at an angel of the order of 60 degrees relative to the guide surface 585.

The roller 551 of the common auger member 550 is divided at a center line 521 into two separate portions on respective sides of the center line. This allows a bearing assembly 522 to be provided at the center line 521 which acts to provide support for the center of the auger member from the cutter bar. The bearing assembly comprises a center plate 523 carried on a bracket 524 from the flange 591 of the beam 592 which provides a bearing 524 for a shaft 525 which is connected at each end to a respective one of the portions of the common auger member on either side of the plate 523 at the center line 521. Thus load from the center of the common auger member 551 is transferred to the cutter bar and is carried thereby to reduce flexing of the common auger member.

As the crop passes over the auger member 550 in the central area at the center line 521, the presence of the support plate and the bearing which is wholly behind the front face of the roller part of the common auger member does not interfere with the passage of the crop. The bearing is desirable in some cases where the common auger member is longer. In other cases more than one bearing can be used at spaced positions along the member so that the load is transferred to the cutter bar structure at locations other than the center.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A crop harvesting header comprising:
    a header frame arranged to be transported across ground on which there is a standing crop for harvesting;
    a cutter bar mounted on the header frame across a width of the header for movement across the ground for harvesting the standing crop;
    a plurality of generally horizontal cutter disks mounted on the cutter bar at positions spaced transversely of the header with the disks being mounted on the cutter bar for driven rotation about respective generally upright axes spaced along the cutter bar;
    each disk having mounted thereon at a position spaced outwardly from the respective axis thereof at least one cutter blade such that rotation of the disk about its axis causes a standing crop to be cut by the blade as it rotates around the axis on the disk;
    the header frame including a discharge opening behind the cutter bar into which the cut crop enters so that the crop is discharged behind the discharge opening for forming a swath behind the header;
    the discharge opening having ends which are spaced inwardly from ends of the cutter bar so that the discharge opening is narrower than the cutter bar;
    at each end, the cutter bar having at least one outer cutter disk at least part of which is located outwardly of a respective end of the discharge opening;
    at each end of the cutter bar there being provided a respective crop converging auger element arranged to receive crop cut by the cutter disks at the respective end of the cutter bar and arranged to move the crop inwardly toward the discharge opening, each auger element including a rotating surface with a flight on the surface;
    each auger element being arranged generally longitudinal of the cutter bar with an outer end thereof spaced outwardly of the respective end of the discharge opening so as to carry the cut crop longitudinally of the cutter bar behind the cutter disks to the discharge opening;
    each auger element forming a part of a common rotary member which extends across the discharge opening so that the common rotary member extends to a position located inwardly of the sides of the discharge opening;
    the common rotary member including each auger element being arranged to rotate in a direction with a front face thereof turning upwardly and rearwardly;
    wherein at each end of the cutter bar there is provided an impeller located at least partly outwardly of the respective outer end of the auger element.

2. The header according to claim 1 wherein a part of the common rotary member is free from the flight.

3. The header according to claim 1 wherein the flight is arranged to extend along a full length of the common rotary member.

4. The header according to claim 1 wherein the impeller is carried on an outermost one of the cutter disks for rotation therewith.

5. The header according to claim 1 wherein there is provided a conditioning system located in the discharge opening.

6. The header according to claim 5 wherein there is provided a conditioning system located in the discharge opening including top and bottom rollers with a nip therebetween and wherein the auger member is arranged such that a topmost tangent to an auger flight thereof is located above the axis of rotation of a bottom roll of the rollers and below the axis of rotation a top roll of the rollers for effective feeding from auger into the conditioner rollers.

7. The header according to claim 1 wherein each auger element is arranged with a forwardmost tangent to an auger flight thereof located at or behind a rearmost extent of the cutter disks.

8. The header according to claim 1 wherein the impeller comprises a plurality of crop engaging elements at angularly spaced positions around an axis of rotation.

9. The header according to claim 1 wherein at each end of the cutter bar there is provided a first impeller located outwardly of the discharge opening and a second impeller located at least partly outwardly of the discharge opening.

10. The header according to claim 9 wherein the first impeller is carried on an outermost one of the cutter disks for rotation therewith.

11. The header according to claim 1 wherein at each end of the discharge opening there are first and second cutter disks located wholly outwardly of the discharge opening and a third cutter disk located at the end of the discharge opening wherein said impeller is located on the first cutter disk for rotation therewith, wherein on the second cutter disk there is provided a second impeller for rotation therewith and wherein there is provided a third impeller located between the first and second impellers.

12. The header according to claim 1 wherein each auger element is located with the outer end thereof spaced inwardly of the respective end of the cutter bar.

13. A crop harvesting header comprising:

a header frame arranged to be transported across ground on which there is a standing crop for harvesting;

a cutter bar mounted on the header frame across a width of the header for movement across the ground for harvesting the standing crop;

a plurality of generally horizontal cutter disks mounted on the cutter bar at positions spaced transversely of the header with the disks being mounted on the cutter bar for driven rotation about respective generally upright axes spaced along the cutter bar;

each disk having mounted thereon at a position spaced outwardly from the respective axis thereof at least one cutter blade such that rotation of the disk about its axis causes a standing crop to be cut by the blade as it rotates around the axis on the disk;

the header frame including a discharge opening behind the cutter bar into which the cut crop enters so that the crop is discharged behind the discharge opening for forming a swath behind the header;

wherein there is provided a conditioning system located in the discharge opening;

the discharge opening having ends which are spaced inwardly from ends of the cutter bar so that the discharge opening is narrower than the cutter bar;

at each end, the cutter bar having at least one outer cutter disk at least part of which is located outwardly of a respective end of the discharge opening;

at each end of the cutter bar there being provided a respective crop converging auger element arranged to receive crop cut by the cutter disks at the respective end of the cutter bar and arranged to move the crop inwardly toward the discharge opening, each auger element including a rotating surface with a flight on the surface;

each auger element being arranged generally longitudinal of the cutter bar with an outer end thereof spaced outwardly of the respective end of the discharge opening so as to carry the cut crop longitudinally of the cutter bar behind the cutter disks to the discharge opening;

each auger element forming a part of a common rotary member which extends across the discharge opening so that the common rotary member extends to a position located inwardly of the sides of the discharge opening;

the common rotary member including each auger element being arranged to rotate in a direction with a front face thereof turning upwardly and rearwardly;

wherein at each end of the discharge opening there are first and second cutter disks located wholly outwardly of the discharge opening and a third cutter disk located at the end of the discharge opening;

wherein there is provided a first impeller located on the first cutter disk for rotation therewith;

wherein there is provided a second impeller on the second cutter disk for rotation therewith;

and wherein there is provided a third impeller located between the first and second impellers.

14. The header according to claim 13 wherein the a part of the common rotary member is free from the flight.

15. The header according to claim 13 wherein the flight is arranged to extend along a full length of the common rotary member.

16. The header according to claim 13 wherein the auger member is arranged such that a topmost tangent to an auger flight thereof is located above the axis of rotation of a bottom roll of the rollers and below the axis of rotation a top roll of the rollers for effective feeding from auger into the conditioner rollers.

17. The header according to claim 13 wherein each auger element is arranged with a forwardmost tangent to an auger flight thereof located at or behind a rearmost extent of the cutter disks.

18. The header according to claim 13 wherein each of the impellers comprises a plurality of crop engaging elements at angularly spaced positions around an axis of rotation.

19. The header according to claim 13 wherein each auger element is located with the outer end thereof spaced inwardly of the respective end of the cutter bar.

* * * * *